(12) United States Patent
Paeng et al.

(10) Patent No.: US 12,021,182 B2
(45) Date of Patent: Jun. 25, 2024

(54) BATTERY MANUFACTURING METHOD

(71) Applicant: LG Chem, Ltd., Seoul (KR)

(72) Inventors: Ki Hoon Paeng, Daejeon (KR); Hyung Seok Han, Daejeon (KR); Hyungkyun Yu, Daejeon (KR); Jaewon Moon, Daejeon (KR); Sang Myeon Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 886 days.

(21) Appl. No.: 17/043,176

(22) PCT Filed: Oct. 29, 2019

(86) PCT No.: PCT/KR2019/014387
§ 371 (c)(1),
(2) Date: Sep. 29, 2020

(87) PCT Pub. No.: WO2020/105884
PCT Pub. Date: May 25, 2020

(65) Prior Publication Data
US 2021/0057774 A1    Feb. 25, 2021

(30) Foreign Application Priority Data

Nov. 20, 2018   (KR) .................. 10-2018-0143839

(51) Int. Cl.
*H01M 10/04*    (2006.01)

(52) U.S. Cl.
CPC ... *H01M 10/0431* (2013.01); *Y10T 29/49108* (2015.01)

(58) Field of Classification Search
CPC ......... H01M 10/0404; H01M 10/0431; H01M 10/0585; H01M 10/0459; H01M 50/531; H01M 4/13; B32B 2457/10; Y10T 29/53135; Y10T 29/49002; Y10T 29/49108
USPC ................... 29/623.1, 2, 623.4, 623.5, 623.2
See application file for complete search history.

(56) References Cited

U.S. PATENT DOCUMENTS

| | | | |
|---|---|---|---|
| 7,967,594 B2* | 6/2011 | Tazoe | H01M 4/0435 72/10.4 |
| 9,871,268 B2* | 1/2018 | Sato | H01M 50/406 |
| 9,931,816 B2 | 4/2018 | Tomamoto et al. | |
| 2008/0098590 A1 | 5/2008 | Tazoe et al. | |

(Continued)

FOREIGN PATENT DOCUMENTS

| | | |
|---|---|---|
| CN | 102148403 A | 8/2011 |
| CN | 104009249 A | 8/2014 |

(Continued)

OTHER PUBLICATIONS

Extended European Search Report including Written Opinion for Application No. 19888148.4 dated May 3, 2021, pp. 1-9.
(Continued)

*Primary Examiner* — Thiem D Phan
(74) *Attorney, Agent, or Firm* — Lerner David LLP

(57) ABSTRACT

The present invention relates to a battery manufacturing device including: a fixed roller that moves an electrode where an active material is applied; a roller that rolls the electrode; and a stopper that is disposed between the fixed roller and the roller, and when the electrode is disconnected, moves the disconnected electrode.

8 Claims, 7 Drawing Sheets

(56) References Cited

U.S. PATENT DOCUMENTS

| | | | |
|---|---|---|---|
| 2010/0212817 A1 | 8/2010 | Nagare et al. | |
| 2011/0192878 A1 | 8/2011 | Teranishi et al. | |
| 2013/0252072 A1 | 9/2013 | Min et al. | |
| 2015/0007769 A1 | 1/2015 | Miura et al. | |

FOREIGN PATENT DOCUMENTS

| | | | |
|---|---|---|---|
| CN | 108680581 A | 10/2018 | |
| EP | 1843414 A1 | 10/2007 | |
| JP | 2001118573 A | 4/2001 | |
| JP | 2007008721 A | 1/2007 | |
| JP | 2009132478 A | 6/2009 | |
| JP | 2010198770 A | 9/2010 | |
| JP | 2012136342 A | 7/2012 | |
| JP | 2014226635 A | 12/2014 | |
| KR | 20060085442 A | 7/2006 | |
| KR | 100972659 B1 | 7/2010 | |
| KR | 20110061517 A | 6/2011 | |
| KR | 20120060703 A | 6/2012 | |
| KR | 20150049575 A | 5/2015 | |
| KR | 20160125051 A | 10/2016 | |
| KR | 101875080 B1 | 7/2018 | |
| WO | 2006080045 A1 | 8/2006 | |
| WO | 2011158584 A1 | 12/2011 | |

OTHER PUBLICATIONS

International Search Report for Appl. No. PCT/KR2019/014387 dated Feb. 17, 2020, 2 pages.
Search Report dated Nov. 4, 22 from Office Action for Application No. 201980013422 dated Nov. 14, 2022. 2 pgs.

* cited by examiner

BATTERY MANUFACTURING METHOD

CROSS-REFERENCE TO RELATED APPLICATIONS

The present application is a national phase entry under 35 U.S.C. § 371 of International Application No. PCT/KR2019/014387, filed on Oct. 29, 2019, which claims priority to Korean Patent Application No. 10-2018-0143839, filed on Nov. 20, 2018, the entire contents of which are incorporated herein by reference.

TECHNICAL FIELD

The present invention relates to a battery manufacturing device and a battery manufacturing method using the same.

BACKGROUND ART

Recently, interest in a price increase of energy sources due to depletion of fossil fuels and environmental pollution has increased, and demand for environmentally-friendly alternative energy sources has become an indispensable factor for future life. Therefore, research on various power generation technologies such as nuclear power, solar power, wind power, and tidal power has been continuously conducted, and interest in a power storing apparatus for efficiently using energy generated as described above has also increased.

Particularly, in accordance with the development of technologies for mobile devices and an increase in demand for the mobile devices, a demand for batteries as an energy source has rapidly increased. Therefore, many studies on the batteries that may satisfy various needs have been conducted.

Typically, there is a high demand for a prismatic rechargeable battery and a pouch type of rechargeable battery that may be used in products such as mobile phones due to a small thickness in terms of a shape of a battery, and there is a high demand for a lithium rechargeable battery such as a lithium ion battery or a lithium ion polymer battery having advantages such as high energy density, high discharging voltage, and output stability in terms of a material of the battery.

The rechargeable battery is manufactured by accommodating an electrode assembly having a structure in which a positive electrode, a negative electrode, and a separator disposed between the positive electrode and the negative electrode are stacked in a battery case.

FIG. 1 is a top plan view of an electrode of a rechargeable, to which an active material is applied. FIG. 2 is a side view of FIG. 1 viewed from the A direction. FIG. 3 is a schematic diagram of a state in which the electrode is disconnected during a rolling process of the electrode of FIG. 1.

Referring to FIG. 1 to FIG. 3, in an electrode 10 of a rechargeable battery, an active material 12 is applied to both sides of a metal current collector 11, and a rolling process is performed to increase the density per unit volume of the applied active material. However, a step is formed between a portion where the active material 12 is applied in the metal current collector 11 and an uncoated region where the active material 12 is not applied, and thus a stress is concentrated in the step portion during the rolling process of the electrode 10, thereby causing the electrode 10 to be bent or to have a disconnection B in the uncoated region.

When such a disconnection occurs in the electrode 10 during the rolling process, the disconnected electrode 10 may be separated from an original movement path, and an operator needs to stop both the manufacturing device and related equipment in order to reconnect the disconnected electrode 10, thereby causing a problem that the operation rate and productivity of the manufacturing equipment are significantly deteriorated.

Therefore, there is a need for a technology that can fundamentally solve this problem.

DISCLOSURE

Technical Problem

In order to solve the above-stated problems, exemplary embodiments of the present invention provide a battery manufacturing device and a battery manufacturing method using the same to prevent an electrode from being disconnected in the rolling process and to reconnect the disconnected electrode without stopping the operation of the battery manufacturing.

Technical Problem

In order to prevent such a purpose, a battery manufacturing device according to the present invention includes: a fixed roller that moves an electrode where an active material is applied; a roller that rolls the electrode; and a stopper that is disposed between the fixed roller and the roller, and when the electrode is disconnected, moves the disconnected electrode.

The battery manufacturing device may further include a tension sensor that detects a tension variation of the electrode.

The tension sensor may transmit a tension abnormality detection signal to the stopper.

The stopper may move toward the electrode in response to the tension abnormality detection signal.

The stopper may include a moving roller that moves the disconnected electrode.

The stopper may include a first stopper, a second stopper, a third stopper, and a fourth stopper.

When the tension sensor does not detect tension abnormality in the electrode, the first stopper and the third stopper may be spaced upwardly from the top of the electrode, and the second stopper and the fourth stopper may be spaced downwardly from the bottom of the electrode.

When the tension sensor detects tension abnormality in the electrode, the first stopper, the second stopper, the third stopper, and the fourth stopper may move toward the electrode, and the first stopper and the third stopper may contact the top of a disconnected electrode and the second stopper and the fourth stopper may contact the bottom of the disconnected electrode to thereby fix the disconnected electrode.

The fixed roller may include an unwinding unit and a winding unit.

When the disconnected electrode between the third stopper and the fourth stopper moves toward the roller, the winding unit may rotate in a direction that is opposite to a direction in which the winding unit rotates when the battery manufacturing device normally operates.

When the disconnected electrode between the first stopper and the second stopper moves toward the roller, the unwinding unit may rotate in a direction in which the winding unit rotates when the battery manufacturing device normally operates.

A battery manufacturing method using the battery manufacturing device according to the present invention includes:
introducing an electrode to which an active material is applied to a roller by using a fixed roller;
measuring a tension of the electrode by operating a tension sensor;
transmitting a tension abnormality detection signal to a stopper by the tension sensor;
holding a disconnected electrode by moving toward the electrode by the stopper;
moving the disconnected electrode to connect the disconnected electrode by the stopper; and
connecting a disconnection portion of the electrode.

MODE FOR INVENTION

Hereinafter, various exemplary embodiments of the present invention will be described in detail with reference to the accompanying drawings so that those skilled in the art may easily practice the present invention. The present invention may be embodied in many different forms, and should not be construed as limited to the exemplary embodiments set forth herein.

In addition, unless explicitly described to the contrary, the word "comprise" and variations such as "comprises" or "comprising" will be understood to imply the inclusion of stated elements but not the exclusion of any other elements.

In addition, throughout the specification, the phrase "top plan view" means that a target part is vertically viewed from the tope.

In addition, throughout the specification, the phrase "cross-sectional view" means that a target part is viewed from the side.

In addition, throughout the specification, "top (surface)" of the electrode means a surface located in the opposite direction of gravity, and "bottom (surface)" of the electrode means the surface located opposite to the top surface.

Figure 1:
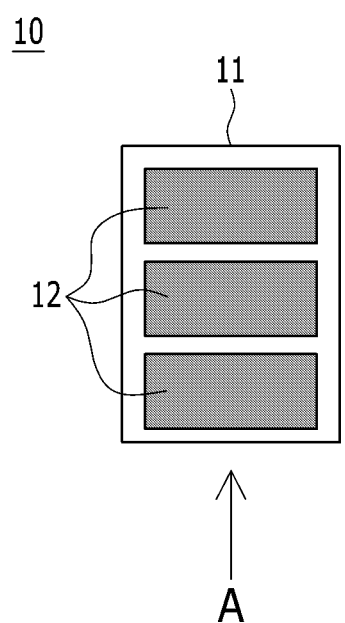
FIG. 1 is a top plan view of an electrode of a rechargeable, to which an active material is applied.
Figure 2:
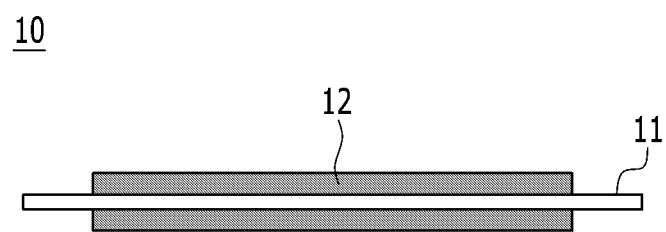
FIG. 2 is a side view of FIG. 1 viewed from the A direction.
Figure 3:
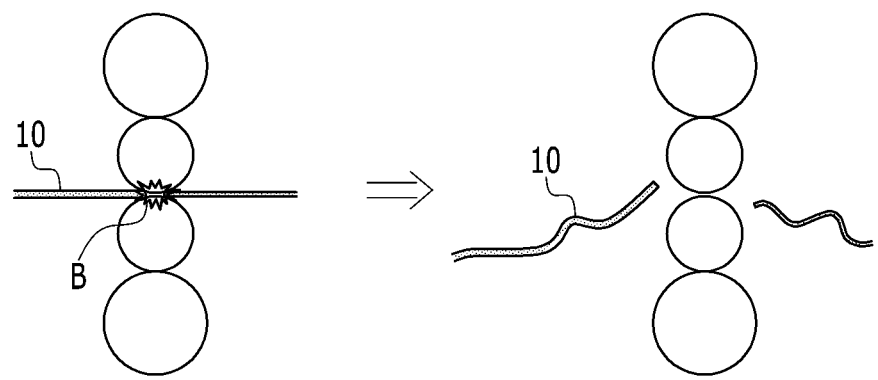
FIG. 3 is a schematic diagram of a state in which the electrode is disconnected during a rolling process of the electrode of FIG. 1.
Figure 4:
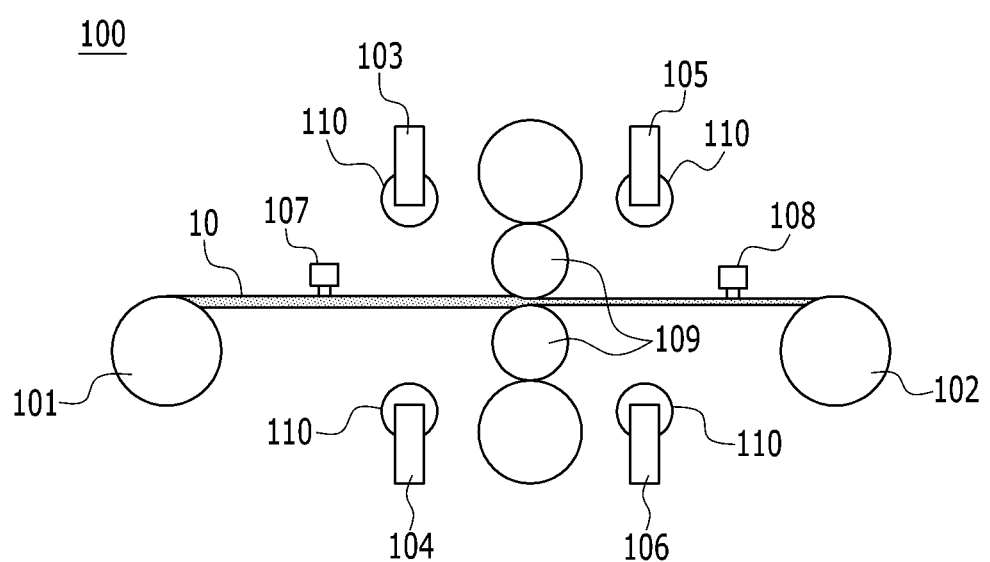
FIG. 4 is a schematic view of a battery manufacturing device according to an exemplary embodiment of the present invention.

FIG. 4 is a schematic view of a battery manufacturing device according to an exemplary embodiment of the present invention.

Referring to FIG. 4, a battery manufacturing device 100 includes an unwinding unit 101, a winding unit 102, rollers 109, a first stopper 103, a second stopper 104, a third stopper 105, and a fourth stopper 106. The roller 109 is disposed between the unwinding unit 101 and the winding unit 102 to roll an electrode 10 that moves to the winding unit 102 from the unwinding unit 101. The structure of the roller 109 is not particularly limited, but may be, for example, a roller capable of compressing the surface of the electrode 10.

While the manufacturing device 100 normally operates, a constant tension may be maintained at the electrode 10 between the unwinding unit 101 and the winding unit 102. The manufacturing device 100 may include a first tension sensor 107 and a second tension sensor 108 that detect tension.

The first tension sensor 107 may be located between the unwinding unit 101 and the first stopper 103 and second stopper 104, and the second tension sensor 108 may be located between the winding unit 102 and the third stopper 105 and fourth stopper 106.

The first tension sensor 107 may transmit a tension abnormality detection signal to the first stopper 103 and the second stopper 104 when the tension is out of a threshold range. Similarly, the second tension sensor 108 may transmit a tension abnormality detection signal to the third stopper 105 and the fourth stopper 106. The tension abnormality detection signal can be transmitted to the first stopper 103, the second stopper 104, the third stopper 105, and the fourth stopper 106 by wire or wirelessly.

As long as the change in the tension can be accurately sensed, the tension sensor is not particularly limited, and for example, the first tension sensor 107 and the second tension sensor 108 may each be a load cell. Since the operation principle of the load cell is already known in the art, a description thereof will be omitted. An operator may select an appropriate load cell in consideration of the tension range maintained at the electrode 10 and use it as the first tension sensor 107 and the second tension sensor 108.

The first stopper 103 and the second stopper 104 may be formed between the unwinding unit 101 and the roller 109 at a portion of the electrode 10 which is introduced into the rollers 109. A third stopper 105 and a fourth stopper 106 may be formed between the winding unit 102 and the roller 109 at a portion of the electrode 10 discharged from the rollers 109.

When disconnection does not occur in the electrode 10 and the battery manufacturing device 100 operates normally, the first stopper 103 may be spaced upwardly from an upper surface of the electrode 10. The second stopper 104 may be spaced downward from the lower surface of the electrode 10. Likewise, the third stopper 105 can be spaced upwardly from the upper surface of electrode 10. The fourth stopper 106 may be spaced downward from the lower surface of the electrode 10.

In addition, when the first tension sensor 107 and the second tension sensor 108 receive a tension abnormality detection signal, the first stopper 103, the second stopper 104, the third stopper 105, and the fourth stopper 016 may move toward the electrode 10, respectively. In addition, the first stopper 103, the second stopper 104, the third stopper 105, and the fourth stopper 016 may include a moving roller 110 to press and move the electrode 10, respectively.

Hereinafter, a method of manufacturing a battery using a battery manufacturing device according to the present exemplary embodiment described above, specifically a process of rolling an electrode active material, will be described.

Figure 5:
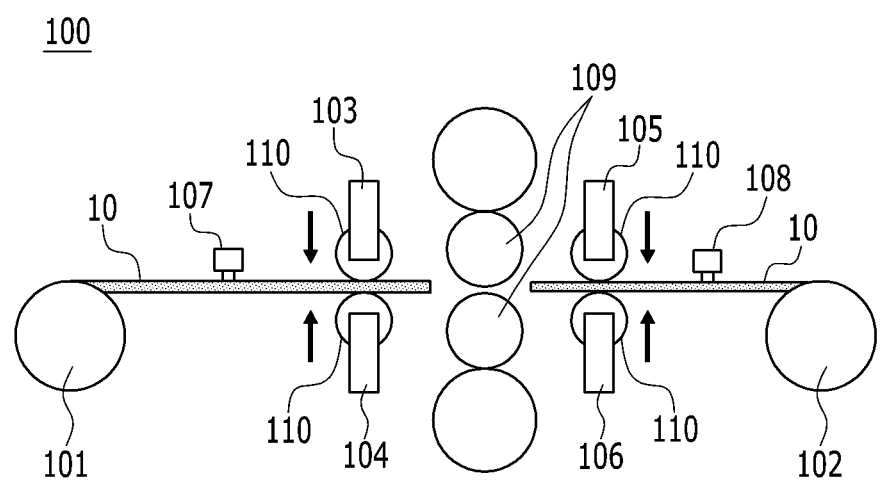
FIG. 5 to FIG. 7 illustrate a battery manufacturing method according to another exemplary embodiment of the present invention.
Figure 6:
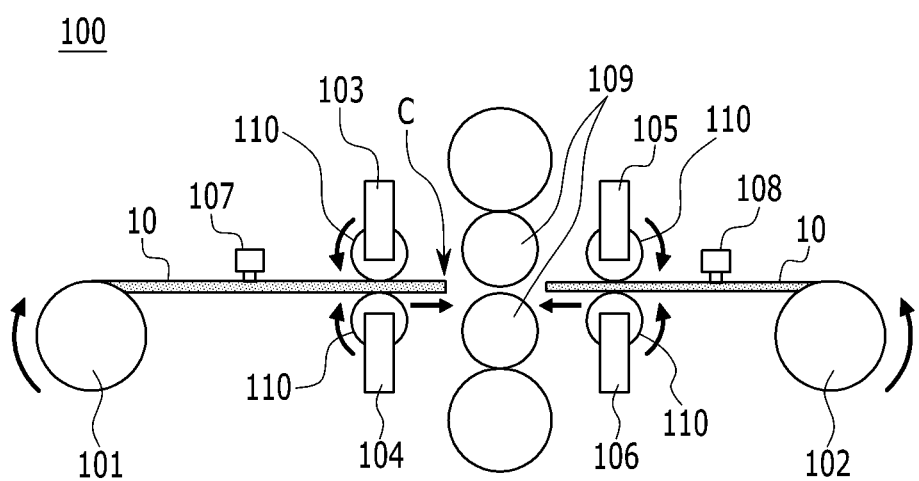
Figure 7:
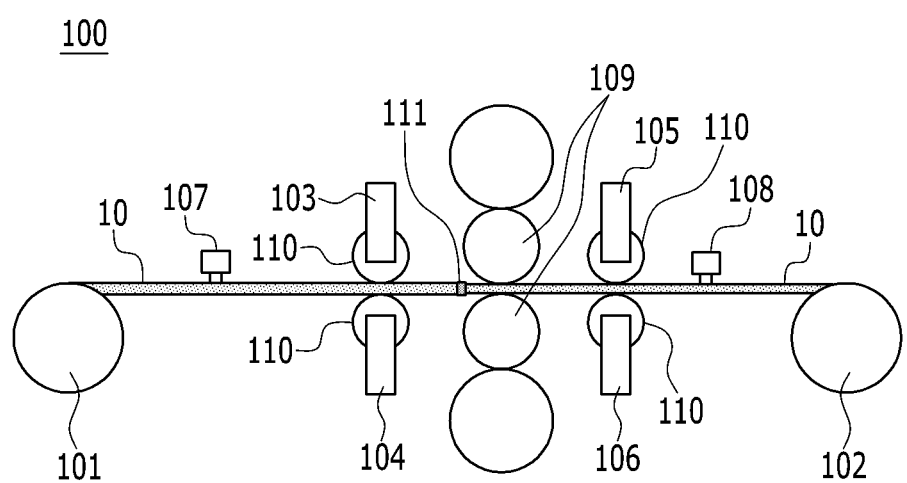

FIG. 5 to FIG. 7 illustrate a battery manufacturing method according to another exemplary embodiment of the present invention. FIG. 5 is a schematic view of the stopper moving toward the electrode side when a disconnection occurs in the electrode in FIG. 4, FIG. 6 is a schematic view of movement of the electrode by the roller of the stopper in FIG. 5, and FIG. 7 is a schematic view that shows the disconnected portion of the electrode is connected.

Referring to FIG. 5, when the tension of the electrode 10 is out of the threshold range or breakage occurs, the first tension sensor 107 and the second tension sensor 108 detect abnormal tension, and the tension abnormality detection signal may be transmitted to the first stopper 103, the second stopper 104, the third stopper 105, and the fourth stopper 106. In addition, in response to the tension anomaly detection signal, the first stopper 103, the second stopper 104, the third stopper 105, and the fourth stopper 016 may move towards the electrode 10.

Specifically, the first stopper 103 moves downward and thus contacts the top surface of the disconnected electrode 10 and the second stopper 104 moves upward and thus contacts the bottom surface of the disconnected electrode 10, such that the disconnected electrode 10 can be fixed to prevent from being separated from the movement path. Similarly, the third stopper 103 moves downward to contact the top surface of the disconnected electrode 10 and the second stopper 104 moves upward to contact the bottom surface of the disconnected electrode 10, such that the disconnected electrode 10 can be fixed to prevent separation from the movement path.

Referring to FIG. 6 and FIG. 7, moving rollers 110 formed in the first stopper 103, the second stopper 104, the third stopper 105, and the fourth stopper 106 operate such that the disconnected electrode 10 can move toward the rollers 109 while the first stopper 103, the second stopper 104, the third stopper 105, and the fourth stopper 106 fix the disconnected electrode 10.

In this case, the moving roller 110 of the first stopper 103 and the moving roller 110 of the fourth stopper 106 rotate along the counterclockwise direction and the moving roller 110 of the second stopper 104 and the moving roller 110 of the third stopper 105 rotate along the clockwise direction such that the disconnected electrode 10 between the moving roller 110 of the first stopper 103 and the moving roller 110 of the second stopper 104 move toward the roller 109 and the moving roller 110 of the third stopper 105 and the disconnected electrode 10 between the moving roller 110 of the fourth stopper 106 may move toward the roller 109. When the disconnected electrode 10 between the moving roller 110 of the third stopper 105 and the moving roller 110 of the fourth stopper 106 moves toward the roller 109, the winding unit 102 may move the electrode 100 while rotating in a direction opposite to the direction in which the manufacturing apparatus 100 operates normally.

When the disconnected electrode 10 between the moving roller 110 of the first stopper 103 and the moving roller 110 of the second stopper 104 moves toward the roller 109, the unwinding unit 101 may rotate in a rotating direction in which the manufacturing apparatus 100 operates normally.

As an exemplary variation, when moving the disconnected electrode 10 between the moving roller 110 of the third stopper 105 and the moving roller 110 of the fourth stopper 106 toward the roller 109, the disconnected electrode 10 between the moving roller 110 of the first stopper 103 and the moving roller 110 of the second stopper 104 may not move.

An operator may reconnect a disconnected portion C of the moved electrode 10 by using a connection member. Here, the connection member may be an insulating tape or the like.

With such a structure, the operator does not need to stop the operation of the battery manufacturing device 100 to connect the disconnected portion C of the electrode 10, and also prevents the detachment of the electrode 10 due to disconnection, thereby improving manufacturing productivity.

Those of ordinary skill in the field of the present invention will be able to make various applications and modifications within the scope of the present invention based on the contents.

INDUSTRIAL APPLICABILITY

As described above, the battery manufacturing device according to the present invention prevents the disconnected electrode from detaching in the rolling process by using a stopper, and can operate the disconnected electrode without stopping the operation of the battery manufacturing device, thereby improving the operating rate and productivity.

The invention claimed is:

1. A battery manufacturing device comprising:
a fixed roller configured to move an electrode where an active material is applied;
a roller configured to roll the electrode;
a stopper that is disposed between the fixed roller and the roller, and configured to move the electrode when it is disconnected; and
a tension sensor capable of detecting a tension variation of the electrode,
wherein the tension sensor is configured to transmit a tension abnormality detection signal to the stopper, and
wherein the stopper comprises a moving roller configured to move the disconnected electrode.

2. The battery manufacturing device of claim 1, wherein the stopper is configured to move toward the electrode in response to the tension abnormality detection signal.

3. The battery manufacturing device of claim 1, wherein the stopper comprises a first stopper, a second stopper, a third stopper, and a fourth stopper.

4. The battery manufacturing device of claim 3, wherein when the tension sensor does not detect a tension abnormality in the electrode, the first stopper and the third stopper are spaced upwardly from a top of the electrode, and the second stopper and the fourth stopper are spaced downwardly from a bottom of the electrode.

5. The battery manufacturing device of claim 3, wherein when the tension sensor detects a tension abnormality in the electrode, the first stopper, the second stopper, the third stopper, and the fourth stopper are configured to move toward the electrode, and the first stopper and the third stopper are configured to contact a top of the disconnected electrode and the second stopper and the fourth stopper are configured to contact a bottom of the disconnected electrode to thereby fix the disconnected electrode.

6. The battery manufacturing device of claim 3, wherein the fixed roller comprises an unwinding unit and a winding unit.

7. The battery manufacturing device of claim 6, wherein when the disconnected electrode between the third stopper and the fourth stopper moves toward the roller, the winding unit is configured to rotate in a direction that is opposite to a direction in which the winding unit is configured to rotate when the battery manufacturing device normally operates.

8. The battery manufacturing device of claim 6, wherein when the disconnected electrode between the first stopper and the second stopper moves toward the roller, the unwinding unit is configured to rotate in a direction in which the winding unit is configured to rotate when the battery manufacturing device normally operates.

* * * * *